(12) United States Patent
Shirriff

(10) Patent No.: US 6,735,220 B1
(45) Date of Patent: May 11, 2004

(54) USING A CENTRALIZED SERVER TO COORDINATE ASSIGNMENT OF IDENTIFIERS IN A DISTRIBUTED SYSTEM

(75) Inventor: Kenneth W. Shirriff, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 773 days.

(21) Appl. No.: 09/629,936

(22) Filed: Aug. 1, 2000

(51) Int. Cl.$^7$ .................................................. H04J 3/24
(52) U.S. Cl. ........................................ 370/475; 709/203
(58) Field of Search ............................. 370/389, 351–3, 370/431, 396–7, 398–9, 395.2, 395.3, 471, 473–6; 709/203, 208–11, 227, 228

(56) References Cited

U.S. PATENT DOCUMENTS 5,815,516 A    9/1998  Aaker et al. .................. 371/53
6,601,101 B1 *  7/2003  Lee et al. ..................... 709/227

FOREIGN PATENT DOCUMENTS

EP    0 605 339 A2   7/1994
WO    WO 95/324463   11/1995
WO    WO 99/33227    7/1999

* cited by examiner

*Primary Examiner*—David Vincent
(74) *Attorney, Agent, or Firm*—Park, Vaughan & Fleming LLP

(57) ABSTRACT

One embodiment of the present invention provides a system that uses a centralized server to coordinate assigning identifiers in a distributed computing system. The system operates by receiving a request for a block of identifiers at the centralized server from a requesting node in the distributed computing system. In response to this request, the system selects a block of identifiers from a global pool of identifiers, and then marks the global pool of identifiers to indicate that the selected block of identifiers has been assigned. The system sends the selected block of identifiers to the requesting node in order to allow the requesting node to assign identifiers from the selected block of identifiers without having to communicate with the centralized server. In one embodiment of the present invention, upon receiving an indication that the selected block of identifiers is no longer being used by the requesting node, the system marks the global pool of identifiers to indicate that the selected block of identifiers is no longer assigned.

33 Claims, 7 Drawing Sheets

USING A CENTRALIZED SERVER TO COORDINATE ASSIGNMENT OF IDENTIFIERS IN A DISTRIBUTED SYSTEM

BACKGROUND

1. Field of the Invention

The present invention relates to distributed computing systems. More specifically, the present invention relates to a method and an apparatus for using a centralized server to coordinate assignment identifiers from multiple nodes in a distributed computing system.

2. Related Art

Computers commonly use TCP/IP (transmission control protocol/Internet protocol) to send data over a network in the form of packets. However, depending upon the structure of the network between the sender and the receiver, a data packet may be broken into smaller pieces called "fragments," in a process known as "fragmentation." The receiver must then re-assemble these fragments to restore the original packet. Note that fragments may arrive in any order, and fragments may arrive multiple times and possibly may not arrive.

To support fragmentation, an IP packet contains a 16-bit identification field, which uniquely identifies each packet that the sender transmits. This identification field is used to identify fragments that should be re-assembled into a single packet, and to ensure that fragments from two different packets do not get combined.

In order to accomplish this objective, the identification field must be unique for a specific sender-receiver pair using a specific protocol for the time that the associated packet may be active in the system. Rather than keeping track of identification numbers separately for each receiver, the sender typically uses sequential identification field values for each packet sent, under the assumption that the time between reuses of an identification field value will be longer than the lifetime of a packet in the network.

This simple assignment of IP identification numbers may not work well if the sender is not a single computer but is instead a cluster of computers. A cluster may include many computers working together to handle network requests.

For many purposes, it is desirable that the cluster appear to the network clients as a single machine. To accomplish this, all outgoing data packets are given a single IP address. With such an architecture, it is no longer sufficient for each node to assign sequential IP identification numbers, because two nodes may use the same number at nearly the same time, raising the potential for garbled data when a recipient attempts to recombine fragments into a packet.

One alternative is for one node in the cluster to do all the TCP/IP processing, including assigning ID numbers. However, the creates a bottleneck on this node. Performance of the cluster will be enhanced if all nodes can perform TCP/IP processing in parallel.

One solution to this problem is to partition the identification numbers between server nodes in the cluster. For example, a first node can use the numbers 1–100, a second node can use the numbers 101–200, and so on. However, this solution does not ensure that identification numbers are unique because there are only 16 bits available for identification numbers. Consequently, the identification numbers will be reused too quickly. For example, if there are 100 servers, each server would receive only $2^{16}/100=655$ values, and would reuse these values in short succession, raising the probability of incorrectly combined fragments.

Another alternative is for each node in the cluster to obtain a unique identification number for each packet from a centralized server. However, this results in a performance bottleneck because each outgoing packet is delayed by the time required to retrieve the next number from the centralized server. Furthermore, the centralized server is likely to become overloaded in handling requests from many nodes.

What is needed is a method and an apparatus for efficiently assigning packet identifiers to packets from multiple nodes in a distributed computing system.

SUMMARY

One embodiment of the present invention provides a system that uses a centralized server to coordinate assigning identifiers in a distributed computing system. The system operates by receiving a request for a block of identifiers at the centralized server from a requesting node in the distributed computing system. In response to this request, the system selects a block of identifiers from a global pool of identifiers, and then marks the global pool of identifiers to indicate that the selected block of identifiers has been assigned. The system sends the selected block of identifiers to the requesting node in order to allow the requesting node to assign identifiers from the selected block of identifiers without having to communicate with the centralized server.

In another embodiment of the present invention, upon receiving an indication that the selected block of identifiers is no longer being used by the requesting node, the system marks the global pool of identifiers to indicate that the selected block of identifiers is no longer assigned.

In another embodiment of the present invention, the system receives a subsequent request for a subsequent block of identifiers from the requesting node along with the indication that the selected block of identifiers is no longer being used.

In another embodiment of the present invention, when the selected block of identifiers is returned to the centralized server, the centralized server ensures that the selected block of identifiers is not immediately assigned again to the requesting node. This is accomplished by marking the selected block of identifiers in the global pool with an identifier for the requesting node.

In one another embodiment of the present invention, the selected block of identifiers includes an Internet Protocol (IP) identifier to be included in a header of an IP packet in order to facilitate reassembly of the IP packet.

In another embodiment of the present invention, the distributed computing system is a clustered computing system containing a plurality of nodes sharing a same IP address.

In another embodiment of the present invention, the global pool of identifiers is structured as a linked list containing blocks of identifiers.

In another embodiment of the present invention, the selected block of identifiers includes a set of consecutive identifier numbers.

In another embodiment of the present invention, the selected block of identifiers includes a set of non-consecutive identifier numbers.

In another embodiment of the present invention, sending the selected block of identifiers to the requesting node involves sending a specifier for a range of consecutive identifier numbers, wherein the specifier includes a starting value for the range and an ending value for the range.

Thus, the present invention does not suffer from the problem of the centralized server becoming overloaded because the centralized server only needs to be contacted once for each block of identifiers. This dramatically reduces the load on the centralized server. It also reduces the time required to send a packet because the centralized server does not have to be contacted before sending the packet.

The present invention also does not suffer from the problem of the IP identification numbers becoming used up too quickly in the case where only a small number of nodes are rapidly using identification numbers. For example, if a cluster of 100 nodes has two nodes currently performing network services, the above-described partitioning solution would only provide 655 packet identifiers for each node before reusing numbers. In contrast, the block solution would provide $2^{16}/2=32768$ packet identifiers for each currently active node. Note that it is typically not possible to determine in advance which nodes are going to be carrying out network activity. Consequently, the partitioning solution has to divide the identification numbers between all 100 nodes, not just the two currently active nodes.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital video discs), and computer instruction signals embodied in a transmission medium (with or without a carrier wave upon which the signals are modulated). For example, the transmission medium may include a communications network, such as the Internet.

Clustered Computing System

Figure 1:
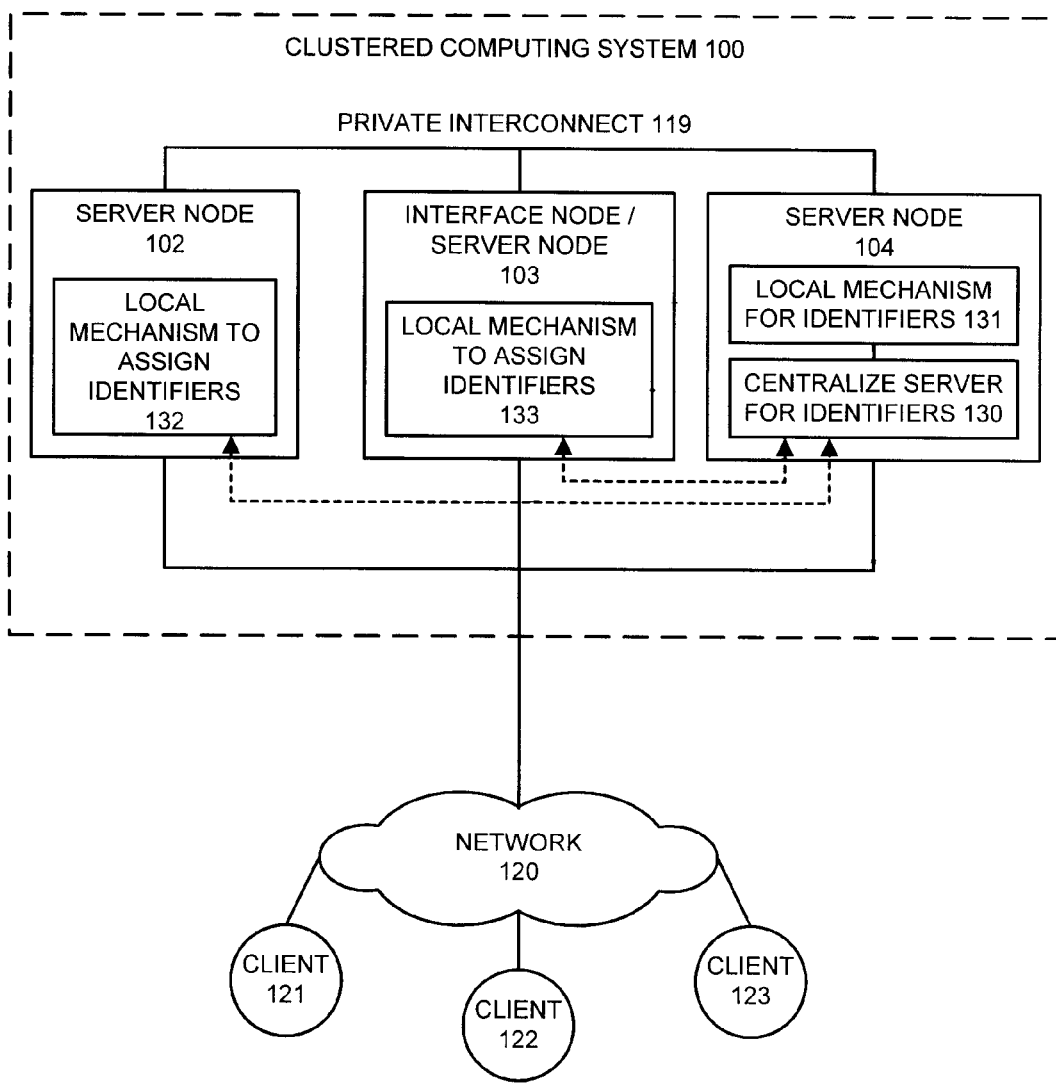
FIG. 1 illustrates a clustered computing system coupled to client computing systems in accordance with an embodiment of the present invention.

FIG. 1 illustrates a clustered computing system 100 coupled to clients 121–123 in accordance with an embodiment of the present invention. Clients 121–123 can include any node on network 120, including computational capability and including a mechanism for communicating across network 120. Clients 121–123 communicate with clustered computing system 100 by sending packets to clustered computing system 100 in order to request services from clustered computing system 100.

Network 120 can include any type of wire or wireless communication channel capable of coupling together computing nodes. This includes, but is not limited to, a local area network, a wide area network, or a combination of networks. In one embodiment of the present invention, network 120 includes the Internet.

Clustered computing system 100 includes a set of nodes that are coupled together through private interconnect 119. These nodes include server nodes 102 and 104 as well as interface node/server node 103.

Nodes 102–104 are coupled together through private interconnect 119, which can generally include any type of communication mechanism. In one embodiment of the present invention, private interconnect 119 adheres to the Ethernet standard. In another embodiment, private interconnect 119 adheres to the scalable coherent interconnect (SCI) standard. Note that the present invention is not meant to be limited to systems that use the Ethernet or SCI standards. In general, the present invention can be used with any networking protocol.

Note that interface node 103 can host one or more shared IP addresses for clustered computing system 100. Also note, that more than one node in clustered computing system 100 can act as an interface node for a given service. This allows a backup interface node to take over for an interface node that fails.

Note that nodes 102–104 within clustered computing system 100 can provide scalable services, wherein additional computing resources can be applied to providing a service as demand for the service increases. Each scalable service behaves as a single logical entity from the view of clients 121–123. Also note that clients 121–123 can communicate with clustered computing system 100 through a transmission control protocol (TCP) connection or a user datagram protocol (UDP) session. Note that other protocols can be used as well with the present invention.)

Clustered computing system 100 operates generally as follows. As packets arrive at interface node 103 from clients 121–123, a service is selected for the packet based on the destination address in the packet. Next, a service instance is selected for the packet based upon the source address of the packet as well as the destination address of the packet. Note that the system ensures that packets belonging to the same TCP connection or UDP instance are sent to the same service instance. Finally, the packet is sent to the selected service instance.

Also note that server nodes 102–104 include mechanisms for assigning identifiers. More specifically, server node 104 hosts centralized server for identifiers 130 and local mechanism for identifiers 131, server node 102 hosts a local mechanism to assign identifiers 132 and server node 103 hosts a local mechanism to assign identifiers 133. During operation, local mechanisms 132–133 request blocks of identifiers from centralized server 130. In response to these requests, centralized server 130 assigns blocks of identifiers to local mechanisms 132–133 from a global pool of identifiers 302 (see FIG. 3). After local mechanisms 132 and 133 have finished assigning identifiers for a block, the block is returned to centralized server 130, and centralized server 130 returns the block to global pool 302. This process is described in more detail below with reference to FIGS. 3–9.

Note that the block size can be modified depending upon the number of nodes in the cluster. In order to allow each node in the cluster to have a block simultaneously, there must be at least as many blocks are there are nodes. Hence, the blocks must be smaller than the number of identifiers divided by the number of nodes in the cluster. However, note that a smaller block size has the advantage of increasing the time between reuse of identifiers since identifiers will not be tied up by a node that is using them more slowly. On the other hand, as blocks get smaller, blocks need to be requested more frequently, which increases system overhead. Hence, the optimal block size depends upon the specific parameters of a specific system and application.

Also note that although the present invention is described in the context of a specific clustered computer system architecture, the present invention can generally be applied to any system in which more than one entity is assigning a set of identifiers.

Internal Structure of Interface Nodes and Server Nodes

Figure 2:
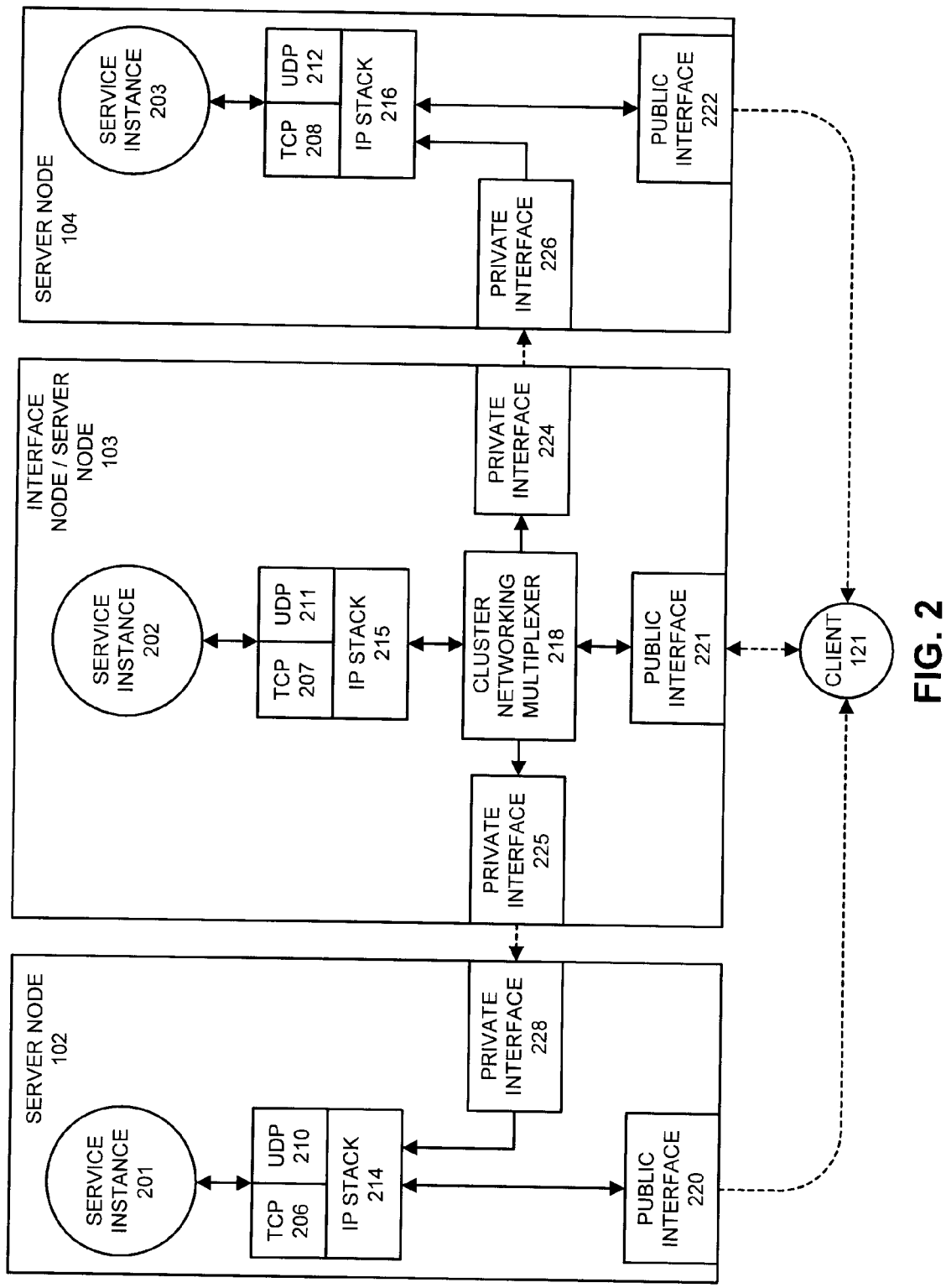
FIG. 2 illustrates the internal structure of an interface/server node and two server nodes within a clustered computing system in accordance with an embodiment of the present invention.

FIG. 2 illustrates the internal structure of interface node 103 and server nodes 102 and 104 within clustered computing system 100 in accordance with an embodiment of the present invention. Client 121 sends packets to clustered computing system 100 in order to receive a service from clustered computing system 100. These packets enter public interface 221 within interface node 103 in clustered computing system 100. Public interface 221 can include any type of interface that is able to receive packets from network 120.

As packets arrive at interface node 103 via public interface 221, they pass through cluster networking multiplexer 218. Cluster networking multiplexer 218 forwards the packets to various nodes within clustered computing system 100 based upon load balancing policies and other considerations.

Packets are forwarded from interface node 103 to other nodes in the clustered computing system 100, including server nodes 102 and 104, through private interfaces 224 and 225. Private interfaces 224 and 225 can include any interface that can handle communications between nodes within clustered computing system 100. For example, packets can be forwarded from private interface 224 to private interface 226 on server node 104, or from private interface 225 to private interface 228 on server node 102. Note that private interfaces 224 and 225 do not handle communications with entities outside of clustered computing system 100.

In some embodiments of the present invention, private interface 224 (and 225) and public interface 221 share some of the same communication hardware and send messages down some of the same physical data paths. In some of these embodiments, private interface 224 and public interface 221 may also share some of the same interface software. Hence, private interface 224 and public interface 221 need not represent different communication mechanisms. Therefore, the distinction between private interface 224 and public interface 221 can be merely a distinction between whether the communications are with an entity outside of clustered computing system 100, or with an entity within clustered computing system 100.

Packets entering server nodes 102 and 104 pass through IP stacks 214 and 216, respectively. Cluster networking multiplexer 218 can also send packets to IP stack 215 within interface node/server node 103, because node 103 is also able to act as a server. On server node 102, packets pass through IP stack 214 into TCP module 206, which supports TCP connections, or into UDP module 210, which supports UDP sessions. Similarly, on interface node/server node 103, packets pass through IP stack 215 into TCP module 207, or into UDP module 211. On server node 104, packets pass through IP stack 216 into TCP module 208, or into UDP module 212. Next, the packets are processed by service instances 201–203 on nodes 102–104, respectively.

Note that return communications for server nodes 102 and 104 do not follow the same path. Return communications from server node 102 pass down through IP stack 214, through public interface 220 and then to client 121. Similarly, return communications from server node 104 pass down through IP stack 216, through public interface 222 and then to client 121. This frees interface node 103 from having to handle return communication traffic.

For web server applications (and some other applications), this return communication mechanism can provide load balancing for the return traffic. Note that web servers typically receive navigational commands from a client, and in response send large volumes of web page content (such as graphical images) back to the client. For these applications, it is advantageous to distribute the return traffic over multiple return pathways to handle the large volume of return traffic.

Centralized Server and Local Mechanism to Assign Identifiers

Figure 3:
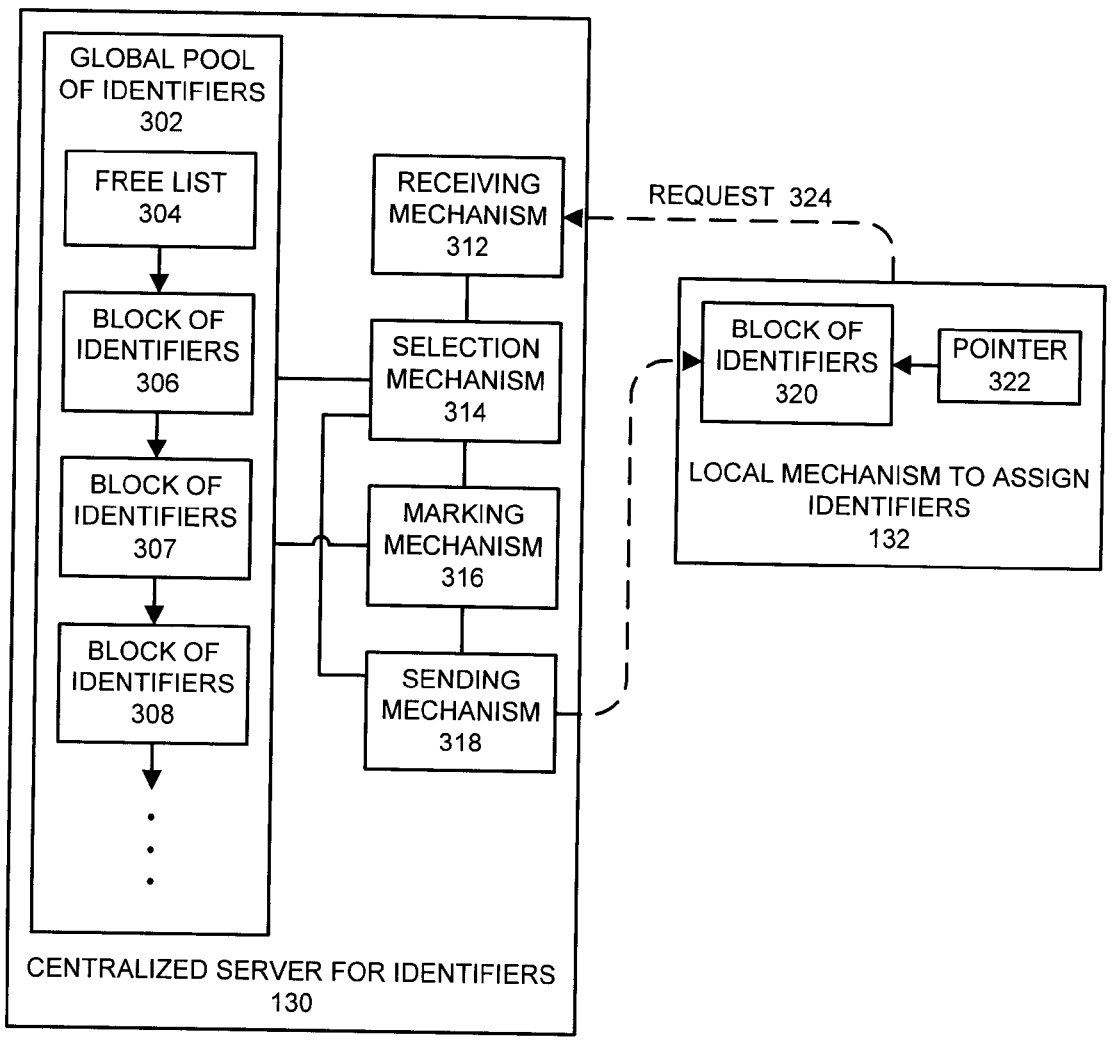
FIG. 3 illustrates a centralized server and a local mechanism to assign identifiers in accordance with an embodiment of the present invention.

FIG. 3 illustrates in more detail centralized server for identifiers 130 and the local mechanism to assign identifiers 132 from FIG. 1 in accordance with an embodiment of the present invention. Centralized server 130 is in communication with a global pool of identifiers 302.

Global pool of identifiers 302 keeps track of which identifiers have been assigned to local mechanisms 132–133. In one embodiment of the present invention, global pool of identifiers 302 includes a free list 304 containing blocks of identifiers 306–308, which have not been allocated. Although in FIG. 3 global pool of identifiers 302 is organized as a linked-list, note that in general any type of indexing structure for keeping track of identifiers can be used. Also note that blocks of identifiers 306–308 contain ranges of consecutive identifier numbers. This makes it possible to store only two values for each range instead of all the numbers in each range. For example, a range of consecutive identifiers 3, 4, 5, 6, 7 can be stored as the end values (3,7), or as the first value and a length (3, 5).

Centralized server 130 also includes a receiving mechanism 312, a selection mechanism 314, a marking mechanism 316 and a sending mechanism 318. Note that each of these mechanisms can be implemented in software as functions or methods. Receiving mechanism 312 receives a request 324 for a block of identifiers from local mechanism 132. Request 324 causes a selection mechanism 314 to select a block of identifiers 320 from global pool 302, and marking mechanism 316 marks global pool 302 to indicate that the block of identifiers 320 has been assigned. Finally, sending mechanism 318 sends the block of identifiers 320 to local mechanism 132.

Local mechanism 132 assigns identifiers from block 320 as they are required. In doing so, local mechanism 132 makes use of a pointer 322 to point to the next location (or range) from a which an identifier is to be allocated.

Process of Assigning Identifiers at Local Mechanism

Figure 4:
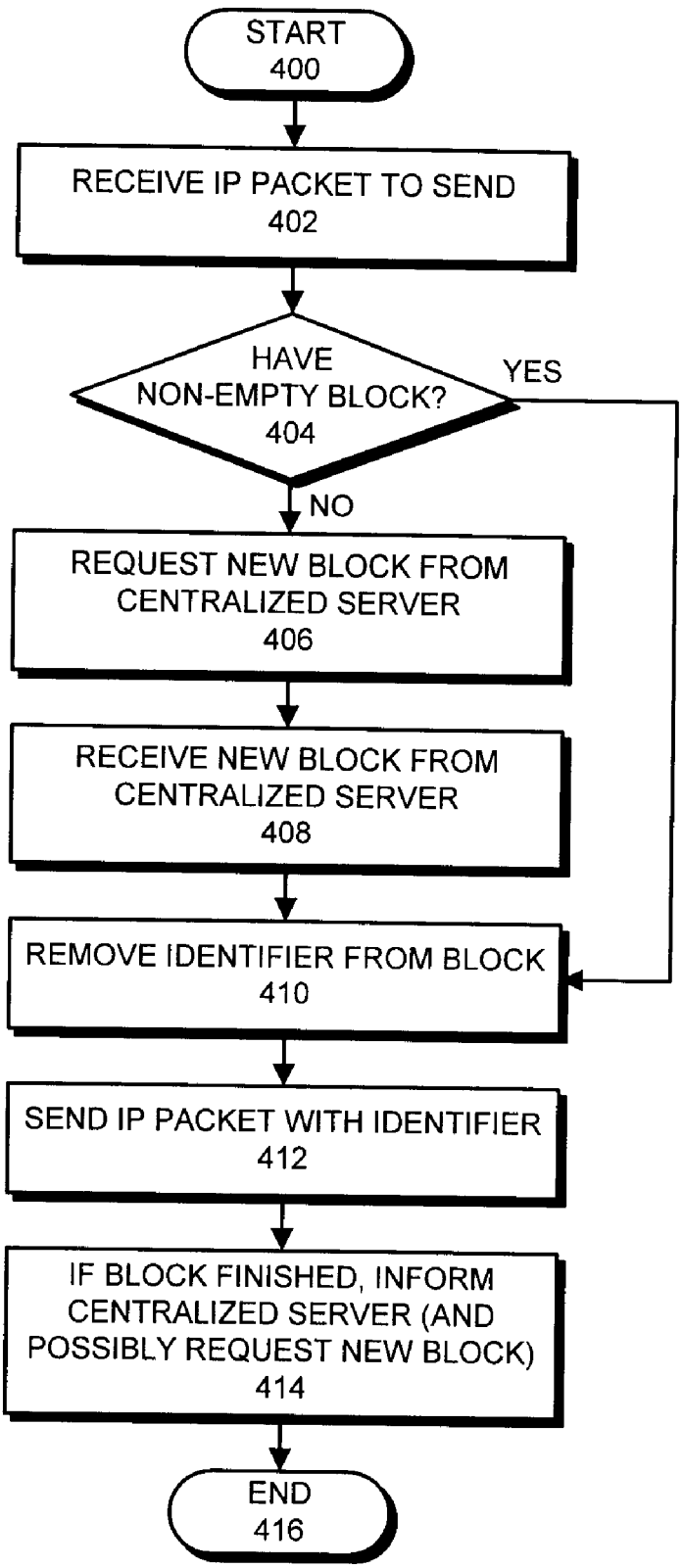
FIG. 4 is a flow chart illustrating the operation of a local mechanism to assign identifiers in accordance with an embodiment of the present invention.

FIG. 4 is a flow chart illustrating the operation of a local mechanism to assign identifiers 132 in accordance with an embodiment of the present invention. Local mechanism 132 starts by receiving an IP packet to send to a remote location, such as to client 121 (step 402). Local mechanism 132 first determines whether it possesses a non-empty block of identifiers (step 404). If not, local mechanism 132 requests a new block of identifiers from centralized server 130 (step 406), and then receives a new block of identifiers 320 from centralized server 130 (step 408).

Next local mechanism 132 removes an identifier from its block of identifiers 320 (step 410), and then sends the IP packet with the identifier (step 412). If at this point block of identifiers 320 is all used up, local mechanism informs centralized server 130 so that centralized server 130 can return block 320 to global pool 302 (step 414). In one embodiment of the present invention, local mechanism 132 additionally requests a new block of identifiers at the same time it informs centralized server 130 that local mechanism 132 is finished with block 320.

Process of Assigning Identifiers at Centralized Server

Figure 5:
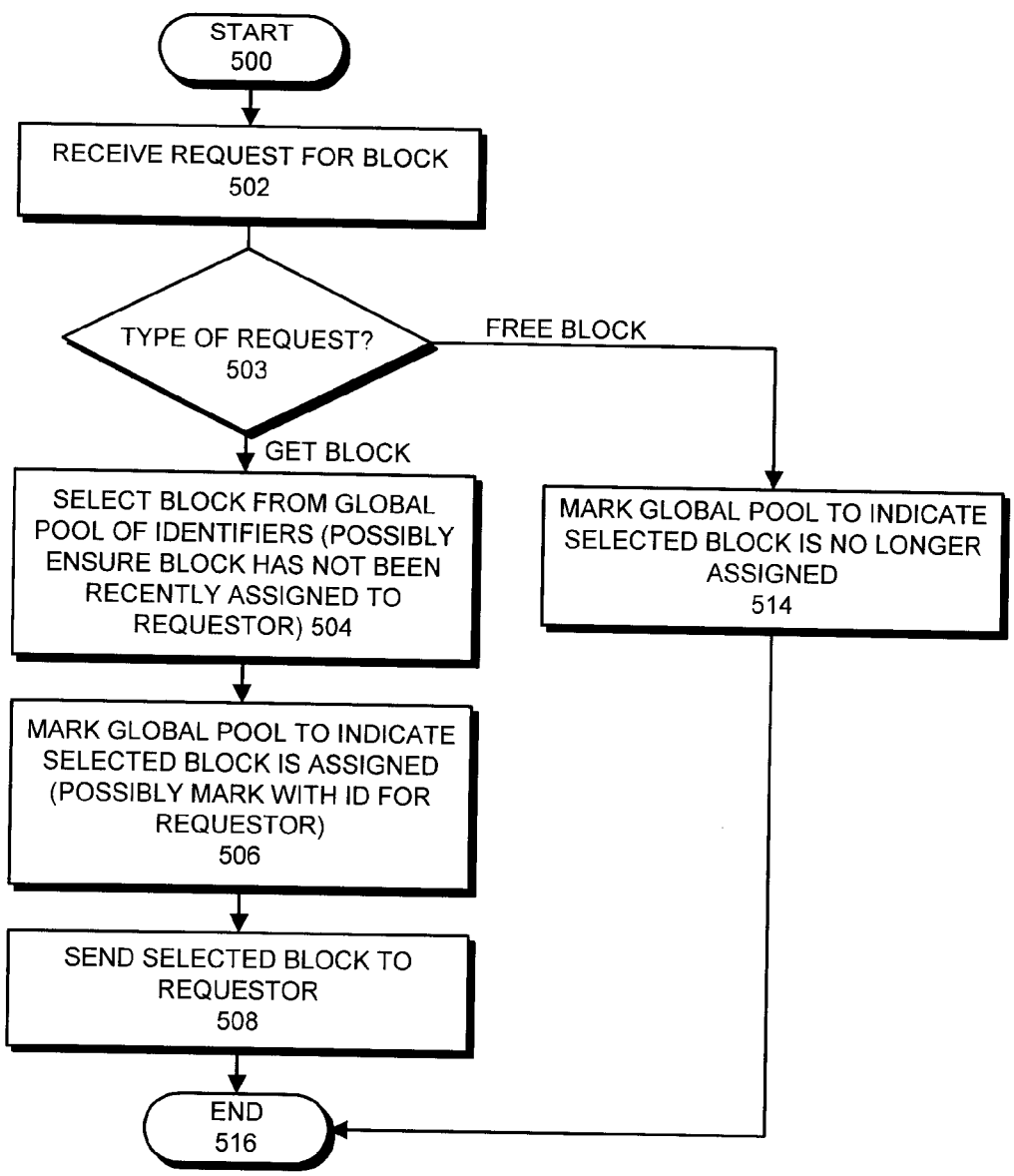
FIG. 5 is a flow chart illustrating how the centralized server assigns blocks of identifiers in accordance with an embodiment of the present invention.

FIG. 5 is a flow chart illustrating how the centralized server 130 assigns blocks of identifiers in accordance with an embodiment of the present invention. Upon receiving a request (step 502), centralized server 130 first determines if the request is to get a block or to free a block (step 503).

If the request is to get a block, centralized server 130 selects a block of identifiers 320 from global pool of identifiers 302 (step 504), and then marks global pool 302 to indicate that the selected block of identifiers 320 has been allocated (step 506). (This can possibly include recording an ID for the request or within global pool 302.) Centralized server 130 then sends selected block of identifiers 320 to the node that requested the block (step 508).

If the request is to free a block, centralized server 130 marks global pool 302 to indicate that selected block 320 is no longer assigned (step 514). If this indication also includes a request for an additional block of identifiers, centralized server 130 repeats steps 504, 506 and 508 to send the additional block of identifiers.

Note that the time between reuses of a block can be improved for the case in which a client 121 communicates with the same node 102 in clustered computing system 100. For example, clustered computing system 100 may direct incoming client requests to a particular node based upon the client's IP address. In this case, step 506 additionally marks each block in global pool 302 with an identifier for the node (or nodes) that last used the block. When centralized server selects a block of identifiers in step 504, centralized server ensures that it selects a block that was last used by a different node.

Note that reuse of numbers is only a problem if a number is reused with a client that used the number before. Hence, by using the above-described improvement, numbers will be reused with different clients, which increases the time between potential reuse. Also note that a block in global pool 302 can either be marked with the last node to use it, or with a list of the last n nodes to use it.

Assigning Process Identifiers

The present invention can additionally be applied to other applications in a distributed system besides allocating IP packet identifiers. For example, a distributed system that provides a single-system image requires a unique process identifier (PID) for each process in the distributed system. As with IP sequence numbers, a fixed partitioning of the process ID space may not leave enough PIDs for each node because different nodes may have different requirements. Also, the overhead involved in contacting a centralized server to allocate each PID may be too high. Hence, the technique of allocating blocks of identifiers may be advantageous for assigning PIDs as well as for assigning IP packet identifiers.

One complication in allocating PIDs is that a node may use a PID for a long time, during which the PID may not be used by another node. This prevents centralized server 130 from allocating fixed size blocks of consecutive identifiers because the continuing use of a single PID from a block prevents continuing use of the block. This problem can ultimately tie up all of the blocks.

In order to solve this problem, the invention can be extended as follows. Instead of a node informing centralized server 130 that the node is finished with an entire block of consecutive PIDs, the node informs centralized server 130 of which PIDs are no longer in use. Also, instead of centralized server 130 providing a fixed size block of consecutive PIDs to requesting nodes, centralized server 130 provides a variable block of PIDs, including PIDs that are no longer in use by other nodes.

In some cases, it is desirable to minimize the size of PIDs for user convenience. This can be accomplished by using a subset of the potential ID range, which can be expanded as additional PIDs are required, subject to time constraints between reuses.

Figure 6:
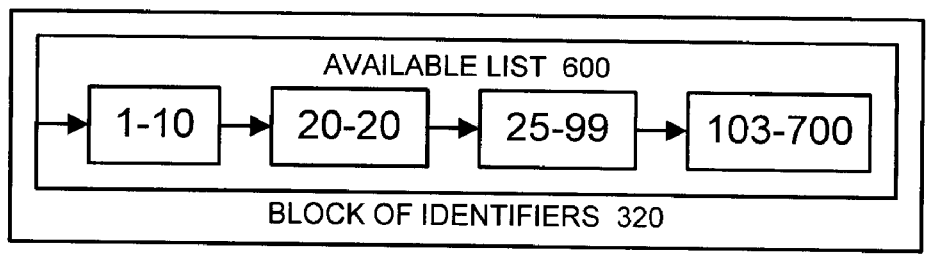
FIG. 6 illustrates the structure of a block of identifiers in accordance with an embodiment of the present invention.

FIG. 6 illustrates the structure of block of identifiers 320 in accordance with an embodiment of the present invention. To reduce storage requirements, centralized server 130 keeps track of free PIDs as sequences, and passes a set of sequences to requesting nodes. Block of identifiers 320 includes an available list 600, which is structured as a linked list containing ranges of identifiers, 1–10, 20—20, 25–99 and 103–700.

Figure 7:
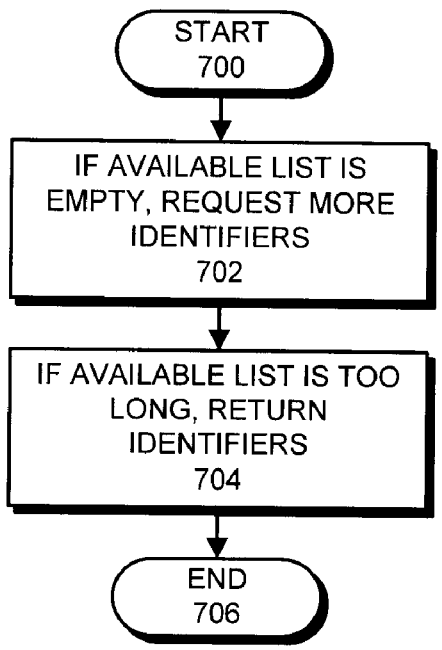
FIG. 7 is a flow chart illustrating how a local mechanism requests and returns identifiers in accordance with an embodiment of the present invention.

FIG. 7 is a flow chart illustrating how a local mechanism 132 requests and returns identifiers in accordance with an embodiment of the present invention. If available list 600 is empty, local mechanism 132 requests more identifiers (step 702). On the other hand, if available list 600 becomes too long (exceeds a pre-defined threshold value), local mechanism 132 returns identifiers to centralized server 130 (step 704). When local mechanism 132 returns a block of identifiers to centralized server 130, the list of ranges in the block is coalesced with a similar list within global pool 302 using well-known techniques for coalescing ranges of numbers.

Figure 8:
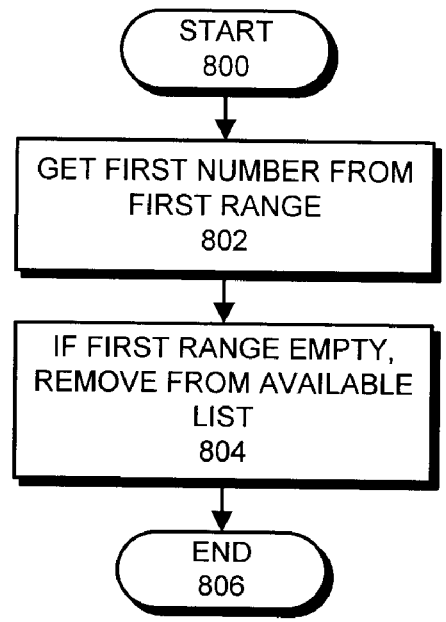
FIG. 8 is a flow chart illustrating how a local mechanism removes an identifier from a block of identifiers in accordance with an embodiment of the present invention.

FIG. 8 is a flow chart illustrating how local mechanism 132 removes an identifier from a block of identifiers 320 in accordance with an embodiment of the present invention. Local mechanism 132 gets the first number from the first range in available list 600 (step 802). After the number is retrieved, if the first range becomes empty, local mechanism 132 removes the first range from available list 600 (step 804).

Figure 9:
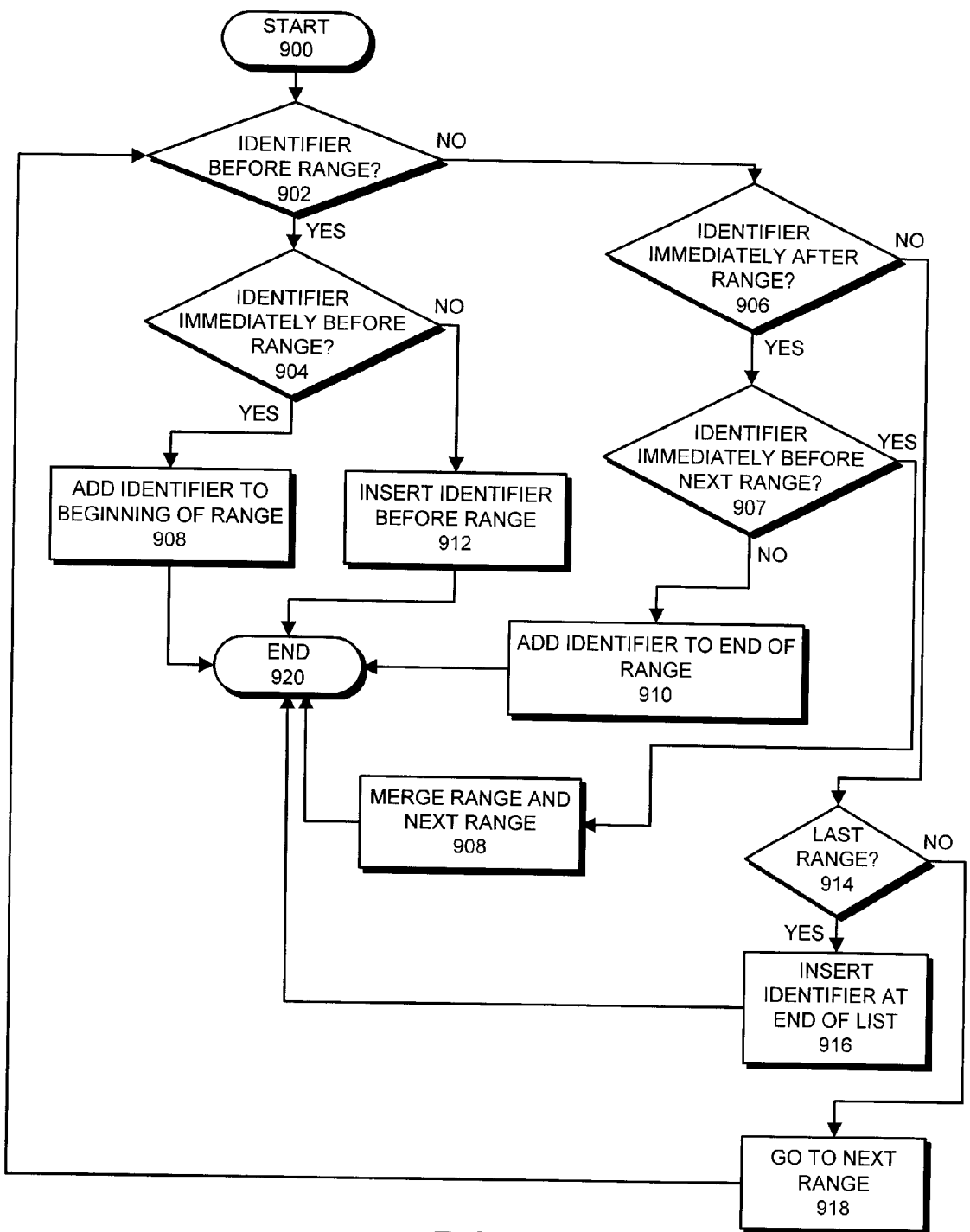
FIG. 9 is a flow chart illustrating how a local mechanism returns an identifier to a block of identifiers in accordance with an embodiment of the present invention.

FIG. 9 is a flow chart illustrating how local mechanism 132 returns an identifier to a block of identifiers 320 in accordance with an embodiment of the present invention. Local mechanism 132 starts with the first range. Local mechanism 132 first determines whether the identifier occurs before the range (step 902). If so, local mechanism 132 determines if the identifier occurs immediately before the range (step 904). If so, local mechanism 132 adds the identifier to the beginning of the range (step 908). If the identifier does not immediately precede the range, local mechanism 132 inserts the identifier before the range in available list 600 (step 912).

If the identifier is not before the range, local mechanism 132 determines if the identifier is immediately after the range (step 906). If so, local mechanism 132 determines if the identifier is immediately before the next range (step 907). If so, local mechanism 132 merges the range and the next range (step 908). If the local identifier is not immediately before the next range, local mechanism 132 adds the identifier to the end of the range (step 910).

If the local identifier is not immediately after the range, local mechanism 132 determines whether the range is the last range in available list 600 (step 914). If so, local mechanism 132 inserts the identifier at the end of available list 600 (step 916). Otherwise, local mechanism 132 proceeds to the next range in available list 600 (step 918) and returns to step 902 to repeat the process.

The foregoing descriptions of embodiments of the invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for using a centralized server to coordinate assigning identifiers in a distributed computing system, comprising:

receiving a request for a block of identifiers at the centralized server in the distributed computing system;

wherein the request is received from a requesting node in the distributed computing system;

selecting the block of identifiers from a global pool of identifiers at the centralized server;

marking the global pool of identifiers to indicate that the selected block of identifiers has been assigned;

sending the selected block of identifiers to the requesting node; and allowing the requesting node to assign identifiers from the selected block of identifiers without having to communicate with the centralized server for each identifier that is assigned.

2. The method of claim 1, further comprising:

receiving an indication that the selected block of identifiers is no longer being used by the requesting node; and marking the global pool of identifiers to indicate that the selected block of identifiers is no longer assigned.

3. The method of claim 2, wherein receiving the indication that the selected block of identifiers is no longer being used by the requesting node includes receiving a subsequent request for a subsequent block of identifiers from the requesting node.

4. The method of claim 2, wherein marking the global pool of identifiers to indicate that the selected block of identifiers has been assigned involves marking the selected block of identifiers with an identifier for the requesting node; and wherein when the selected block of identifiers is returned to the centralized server and subsequently assigned again, the centralized server ensures that the selected block of identifiers is not immediately assigned again to the requesting node.

5. The method of claim 1, wherein the selected block of identifiers includes an Internet Protocol (IP) identifier to be included in a header of an IP packet in order to facilitate reassembly of the IP packet.

6. The method of claim 5, wherein the distributed computing system is a clustered computing system containing a plurality of nodes sharing a same IP address.

7. The method of claim 1, wherein the selected block of identifiers includes a plurality of process identifiers for uniquely identifying processes within the distributed computing system.

8. The method of claim 1, wherein the global pool of identifiers is structured as a linked list containing blocks of identifiers.

9. The method of claim 1, wherein the selected block of identifiers includes a set of consecutive identifier numbers.

10. The method of claim 1, wherein the selected block of identifiers includes a set of non-consecutive identifier numbers.

11. The method of claim 1, wherein sending the selected block of identifiers to the requesting node involves sending a specifier for a range of consecutive identifier numbers, wherein the specifier includes a starting value for the range and an ending value for the range.

12. A computer-readable storage medium storing instructions that when executed by a computer cause the computer to perform a method for using a centralized server to coordinate assigning identifiers in a distributed computing system, the method comprising:

receiving a request for a block of identifiers at the centralized server in the distributed computing system;

wherein the request is received from a requesting node in the distributed computing system;

selecting the block of identifiers from a global pool of identifiers at the centralized server;

marking the global pool of identifiers to indicate that the selected block of identifiers has been assigned;

sending the selected block of identifiers to the requesting node; and allowing the requesting node to assign identifiers from the selected block of identifiers without having to communicate with the centralized server for each identifier that is assigned.

13. The computer-readable storage medium of claim 12, wherein the method further comprises:

receiving an indication that the selected block of identifiers is no longer being used by the requesting node; and marking the global pool of identifiers to indicate that the selected block of identifiers is no longer assigned.

14. The computer-readable storage medium of claim 13, wherein receiving the indication that the selected block of identifiers is no longer being used by the requesting node includes receiving a subsequent request for a subsequent block of identifiers from the requesting node.

15. The computer-readable storage medium of claim 13, wherein marking the global pool of identifiers to indicate that the selected block of identifiers has been assigned involves marking the selected block of identifiers with an identifier for the requesting node; and wherein when the selected block of identifiers is returned to the centralized server and subsequently assigned again, the centralized server ensures that the selected block of identifiers is not immediately assigned again to the requesting node.

16. The computer-readable storage medium of claim 12, wherein the selected block of identifiers includes an Internet Protocol (IP) identifier to be included in a header of an IP packet in order to facilitate reassembly of the IP packet.

17. The computer-readable storage medium of claim 16, wherein the distributed computing system is a clustered computing system containing a plurality of nodes sharing a same IP address.

18. The computer-readable storage medium of claim 12, wherein the selected block of identifiers includes a plurality of process identifiers for uniquely identifying processes within the distributed computing system.

19. The computer-readable storage medium of claim 12, wherein the global pool of identifiers is structured as a linked list containing blocks of identifiers.

20. The computer-readable storage medium of claim 12, wherein the selected block of identifiers includes a set of consecutive identifier numbers.

21. The computer-readable storage medium of claim 12, wherein the selected block of identifiers includes a set of non-consecutive identifier numbers.

22. The computer-readable storage medium of claim 12, wherein sending the selected block of identifiers to the requesting node involves sending a specifier for a range of consecutive identifier numbers, wherein the specifier includes a starting value for the range and an ending value for the range.

23. An apparatus that uses a centralized server to coordinate assigning identifiers in a distributed computing system, comprising:
- a receiving mechanism that is configured to receive a request for a block of identifiers at the centralized server in the distributed computing system;
- wherein the request is received from a requesting node in the distributed computing system;
- a selection mechanism that is configured to select the block of identifiers from a global pool of identifiers at the centralized server;
- a marking mechanism that is configured to mark the global pool of identifiers to indicate that the selected block of identifiers has been assigned;
- a sending mechanism that is configured to send the selected block of identifiers to the requesting node so that the requesting node can assign identifiers from the selected block of identifiers without having to communicate with the centralized server for each identifier that is assigned.

24. The apparatus of claim 23,
- wherein the receiving mechanism is additionally configured to receive an indication that the selected block of identifiers is no longer being used by the requesting node; and
- wherein the marking mechanism is additionally configured to mark the global pool of identifiers to indicate that the selected block of identifiers is no longer assigned.

25. The apparatus of claim 24, wherein the receiving mechanism is additionally configured to receive a single message containing both the indication that the selected block of identifiers is no longer being used by the requesting node, and a subsequent request for a subsequent block of identifiers from the requesting node.

26. The apparatus of claim 24,
- wherein the marking mechanism is additionally configured to mark the selected block of identifiers within the global pool of identifiers with an identifier for the requesting node; and
- wherein when the selected block of identifiers is returned to the centralized server and subsequently assigned again, the selection mechanism is configured to ensure that the selected block of identifiers is not immediately assigned again to the requesting node.

27. The apparatus of claim 23, wherein the selected block of identifiers includes an Internet Protocol (IP) identifier to be included in a header of an IP packet in order to facilitate reassembly of the IP packet.

28. The apparatus of claim 27, wherein the distributed computing system is a clustered computing system containing a plurality of nodes sharing a same IP address.

29. The apparatus of claim 23, wherein the selected block of identifiers includes a plurality of process identifiers for uniquely identifying processes within the distributed computing system.

30. The apparatus of claim 23, wherein the global pool of identifiers is structured as a linked list containing blocks of identifiers.

31. The apparatus of claim 23, wherein the selected block of identifiers includes a set of consecutive identifier numbers.

32. The apparatus of claim 23, wherein the selected block of identifiers includes a set of non-consecutive identifier numbers.

33. The apparatus of claim 23, wherein the sending mechanism is configured to send the selected block of identifiers to the requesting node by sending a specifier for a range of consecutive identifier numbers, wherein the specifier includes a starting value for the range and an ending value for the range.

* * * * *